United States Patent
Hsu

(10) Patent No.: US 7,444,716 B2
(45) Date of Patent: Nov. 4, 2008

(54) DUAL-AXLE HINGE

(75) Inventor: Chun-Ching Hsu, Shulin (TW)

(73) Assignee: Shin Zu Shing Co., Ltd, Taipei Hsien (TW)

( * ) Notice: Subject to any disclaimer, the term of this patent is extended or adjusted under 35 U.S.C. 154(b) by 315 days.

(21) Appl. No.: 11/410,710

(22) Filed: Apr. 25, 2006

(65) Prior Publication Data

US 2007/0245524 A1 Oct. 25, 2007

(51) Int. Cl.
*E05D 3/00* (2006.01)

(52) U.S. Cl. .................. 16/366; 248/284.1; 248/917; 16/354; 16/337; 16/340; 361/681

(58) Field of Classification Search .............. 16/29, 16/30, 31 R, 31 A, 44; 301/9.1, 111.01, 111.05, 301/111.06; 403/373–374.3; 248/274.1, 248/276.1, 284.1, 917–924; 49/339, 340, 49/341, 342; 296/146.12; 361/681; 312/223.1–223.6; 345/169, 905; 349/58, 65
See application file for complete search history.

(56) References Cited

U.S. PATENT DOCUMENTS

| | | | | |
|---|---|---|---|---|
| 6,227,508 B1 * | 5/2001 | Panzarella et al. | ...... | 248/276.1 |
| 6,515,853 B2 * | 2/2003 | Saito | ............ | 361/681 |
| 6,822,857 B2 * | 11/2004 | Jung et al. | ............ | 361/681 |
| 6,929,224 B1 * | 8/2005 | Masuda et al. | ............ | 248/176.3 |
| 7,333,322 B2 * | 2/2008 | Hwang et al. | ............ | 361/681 |
| 2003/0223188 A1 * | 12/2003 | Ha et al. | ............ | 361/681 |
| 2004/0211866 A1 * | 10/2004 | Jung et al. | ............ | 248/133 |
| 2006/0032998 A1 * | 2/2006 | Depay | ............ | 248/291.1 |
| 2006/0101619 A1 * | 5/2006 | Tai | ............ | 16/366 |
| 2007/0023598 A1 * | 2/2007 | Kim et al. | ............ | 248/276.1 |
| 2007/0195495 A1 * | 8/2007 | Kim et al. | ............ | 361/681 |
| 2007/0210221 A1 * | 9/2007 | Kim et al. | ............ | 248/124.1 |

* cited by examiner

*Primary Examiner*—Patricia Engle
*Assistant Examiner*—Emily M Morgan
(74) *Attorney, Agent, or Firm*—Alan Kamrath; Kamrath & Associates PA

(57) ABSTRACT

A duel-axle hinge has two adjusting assemblies, a connecting assembly, two lifting assemblies and a positioning gear assembly. The adjusting assemblies are attached to a screen of a liquid crystal display (LCD). The lifting assemblies are attached to a support of the LCD. The screen is turned via the adjusting assemblies to adjust the visual angle of the screen. The screen is turned via the lifting assemblies to adjust the height of the screen. The positioning gear assembly can provide positioning function to hold the screen at a desired height.

8 Claims, 7 Drawing Sheets

DUAL-AXLE HINGE

BACKGROUND OF THE INVENTION

1. Field of the Invention

The present invention relates to a dual-axle hinge, especially to a dual-axle hinge attached to a liquid crystal display to allow a screen to pivot relative to a support.

2. Description of the Prior Arts

A liquid crystal display (LCD) comprises a screen, a support and a conventional dual-axle hinge. The conventional dual-axle hinge connects the screen to the support to allow the screen to pivot relative to the support and comprises an adjusting hinge assembly and a lifting hinge assembly. The adjusting hinge assembly allows the visual angle of the screen to be adjusted. The lifting hinge assembly allows the screen to be moved upward and downward relative to the support and has a positioning capability to position the screen at a desired height. The positioning capability may be provided by the friction between a spring and a sleeve or may be provided by a corresponding protrusion and detent. However, the sizes of screens are getting larger so the weight of the screen is also getting heavier. The conventional positioning capability is not sufficient to hold heavier screens in position. Therefore, the screen cannot be positioned at a desired height.

To overcome the shortcomings, the present invention provides a dual-axle hinge to mitigate or obviate the aforementioned problems.

SUMMARY OF THE INVENTION

The main objective of the present invention is to provide a duel-axle hinge to position the screen when the screen is lifted. The duel-axle hinge has two adjusting assemblies, a connecting assembly, two lifting assemblies and a positioning gear assembly. The adjusting assemblies are attached to a screen of a liquid crystal display (LCD). The lifting assemblies are attached to a support of the LCD. The screen is turned via the adjusting assemblies to adjust the visual angle of the screen. The screen is turned via the lifting assemblies to adjust the height of the screen. The positioning gear assembly can provide positioning function to hold the screen at a desired height.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
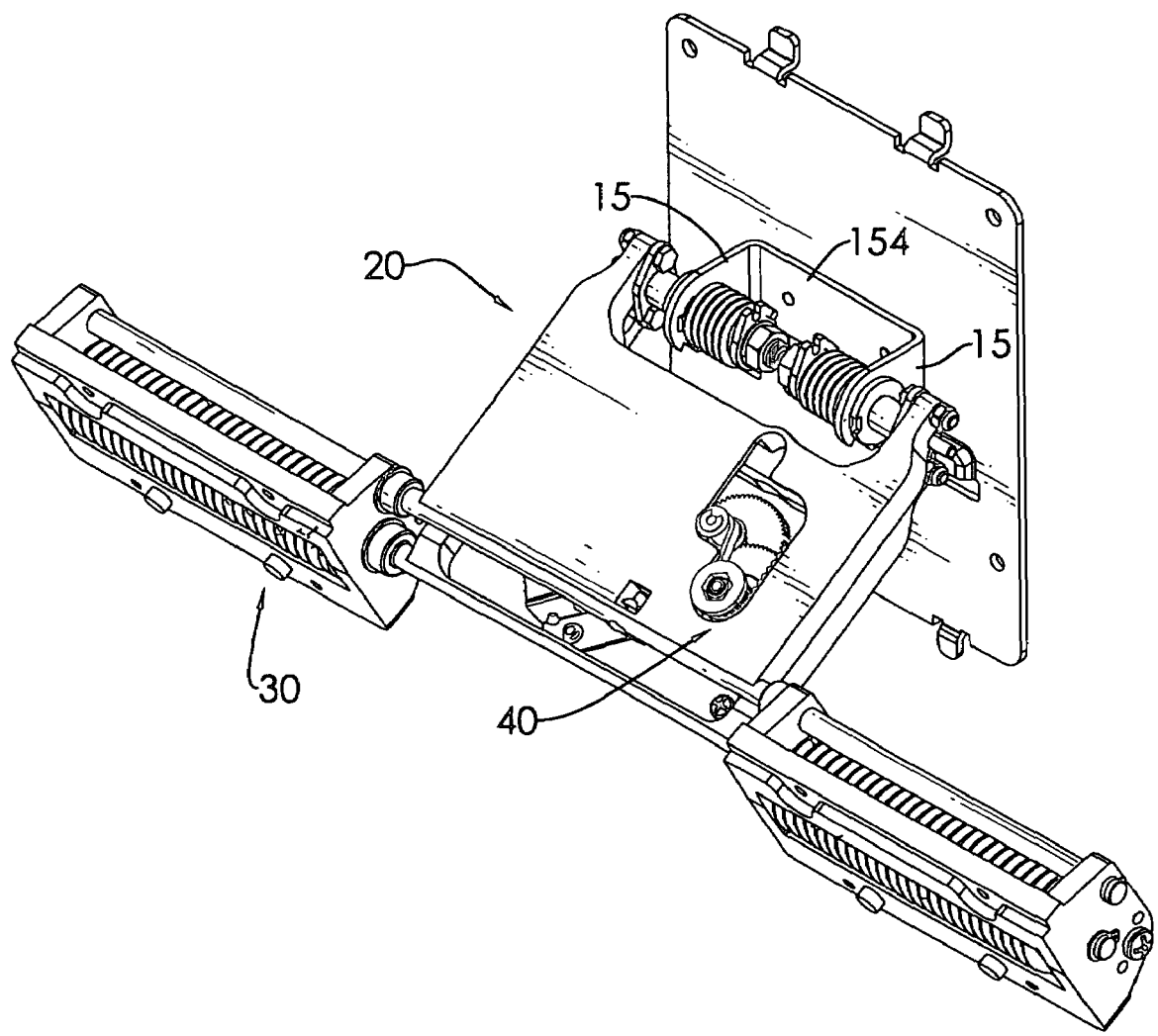
FIG. 1 is a perspective view of a dual-axle hinge in accordance with the present invention.
Figure 2:
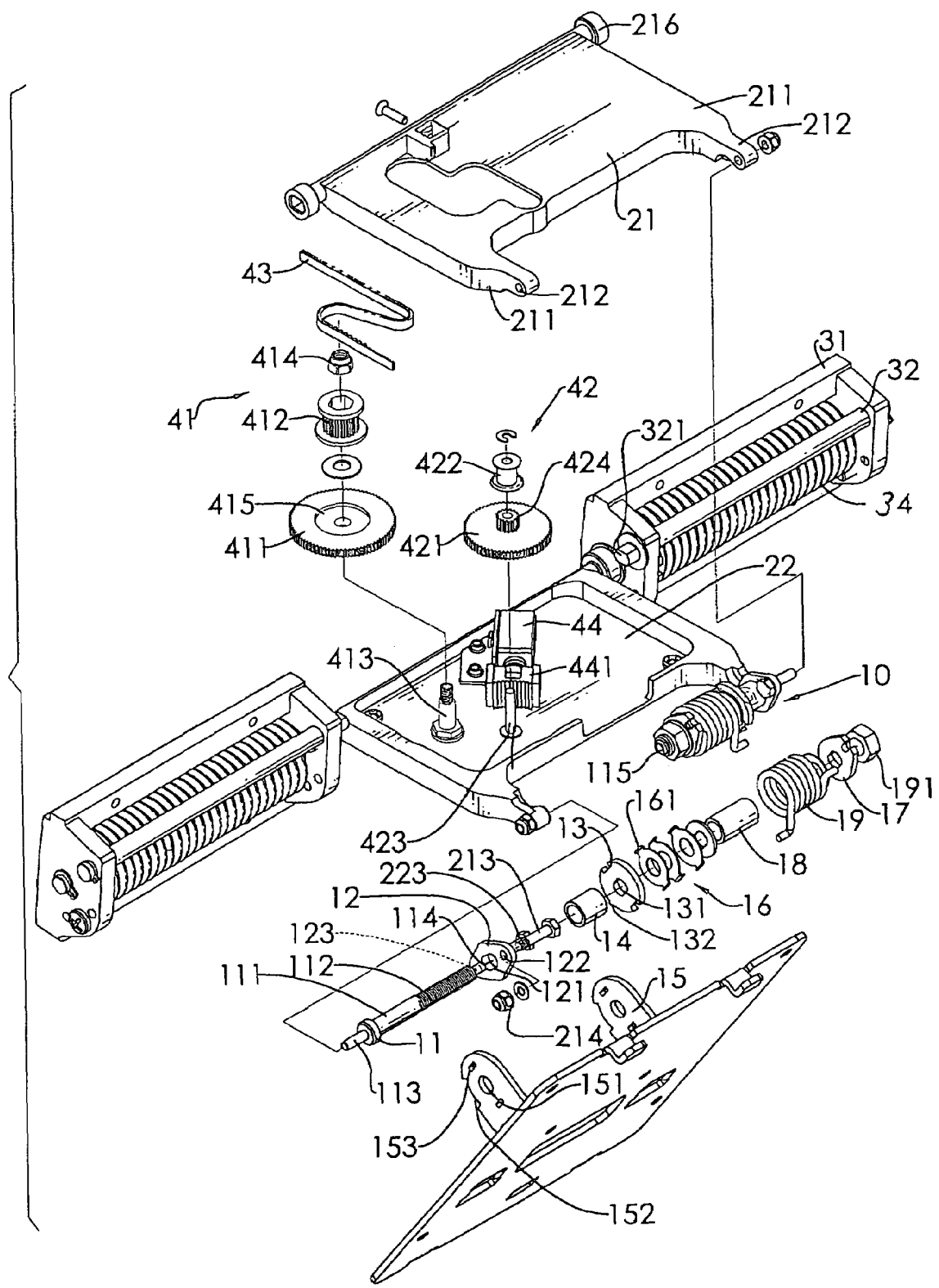
FIG. 2 is an exploded perspective view of the dual-axle hinge in FIG. 1.

With reference to FIGS. 1 and 2, a dual-axle hinge in accordance with the present invention comprises two adjusting assemblies (10), a connecting assembly (20), two lifting assemblies (30) and a positioning gear assembly (40).

The adjusting assemblies (10) connect to each other. Each adjusting assembly (10) comprises an adjusting shaft (11), a connecting sheet (12), a limiting sheet (13), a first sleeve (14), a rotating bracket (15), multiple spacers (16), a fastening washer (17), a second sleeve (18), a torsion spring (19) and a fastener (191).

The adjusting shaft (11) has an inner end, an outer end, an extension rod (111), multiple threads (112) and a fastening rod (113). The extension rod (111) is formed axially on the inner end of the adjusting shaft (11), is non-circular in cross section and has a distal end. The threads (112) are formed around the extension rod (111). The fastening rod (113) is formed on the outer end of the adjusting shaft (11). The two adjusting shafts (11) of the two adjusting assemblies (10) respectively have a connecting rod (114) and a mounting recess (115). The connecting rod (114) is formed on the distal end of one of the adjusting shafts (11). The mounting recess (115) is formed in the distal end of the other one of the adjusting shafts (11) and engages the connecting rod (114) to connect the two adjusting assemblies (10) together.

The connecting sheet (12) is mounted securely on the adjusting shaft (11) and has a central hole (121), a first hole (122) and a second hole (123). The central hole (121) of the connecting sheet (12) is non-circular and engages the extension rod (111) of the adjusting shaft (11) to mount the connecting sheet (12) securely on the adjusting shaft (11). The first and second holes (122, 123) are formed through the connecting sheet (12) and are opposite to each other.

The limiting sheet (13) is mounted securely on the adjusting shaft (11) and has an edge, a central hole (131) and a limit protrusion (132). The central hole (131) of the limiting sheet (13) is non-circular and engages the extension rod (111) of the adjusting shaft (11) to mount the limiting sheet (13) securely on the adjusting shaft (11). The limiting protrusion (132) is formed on and extends axially out of the edge of the limiting sheet (13).

The first sleeve (14) is mounted around the adjusting shaft (11) and is mounted between the connecting sheet (12) and the limiting sheet (13).

The rotating bracket (15) is mounted around the adjusting shaft (11), is adjacent to the limiting sheet (13) and has an edge, a circular hole (151), a notch (152) and multiple fastening holes (153). The circular hole (151) is formed through the rotating bracket (15) and is mounted around the extension rod (111) of the adjusting shaft (11). The notch (152) is formed radially in the edge of the rotating bracket (15) and corresponds to the limiting protrusion (132) of the limiting sheet (13) to provide the limiting protrusion (132) sliding in the notch (152). The fastening holes (153) are formed through the rotating bracket (15). The dual-axle hinge of the present invention further comprises a connecting board (154). The connecting board (154) is attached respectively to the two rotating brackets (15) to connect the two rotating brackets (15) together.

The spacers (16) are mounted around the adjusting shaft (11). Each spacer (16) has a fastening protrusion (161) formed on the spacer (16) and extending through a corresponding fastening hole (153) in the rotating bracket (15).

The fastening washer (17) is mounted securely on the extension rod (111) of the adjusting shaft (11).

The second sleeve (18) is mounted around the adjusting shaft (11) and is adjacent to the fastening washer (17).

The torsion spring (19) is mounted around the second sleeve (18) and is attached respectively to the rotating bracket (15) and the fastening washer (17).

The fastener (191) is mounted securely on the adjusting shaft (11) to hold all the elements of the adjusting assembly (10). The fastener (191) is a nut to screw onto the threads (112) on the adjusting shaft (11).

The connecting assembly (20) connects to the adjusting assemblies (10) and comprises a cover (21) and a shell (22).

The cover (21) has two sides, two attaching leaves (211), two pins (213) and two nuts (214). The attaching leaves (211) are formed respectively on the two sides of the cover (21). Each attaching leaf (211) has a first end (212) and a second end (216). The first ends (212) of the attaching leaves (211) respectively correspond to the first holes (122) of the connecting sheets (12) of the adjusting assemblies (10). Each pin (213) of the cover (21) extends through the first end (212) of the attaching leaf (211) and the first hole (122) of the connecting sheet (12). Each nut (214) is fastened on the pin (213) to hold the attaching leaves (211) and the connecting sheets (12) securely together.

Figure 3:
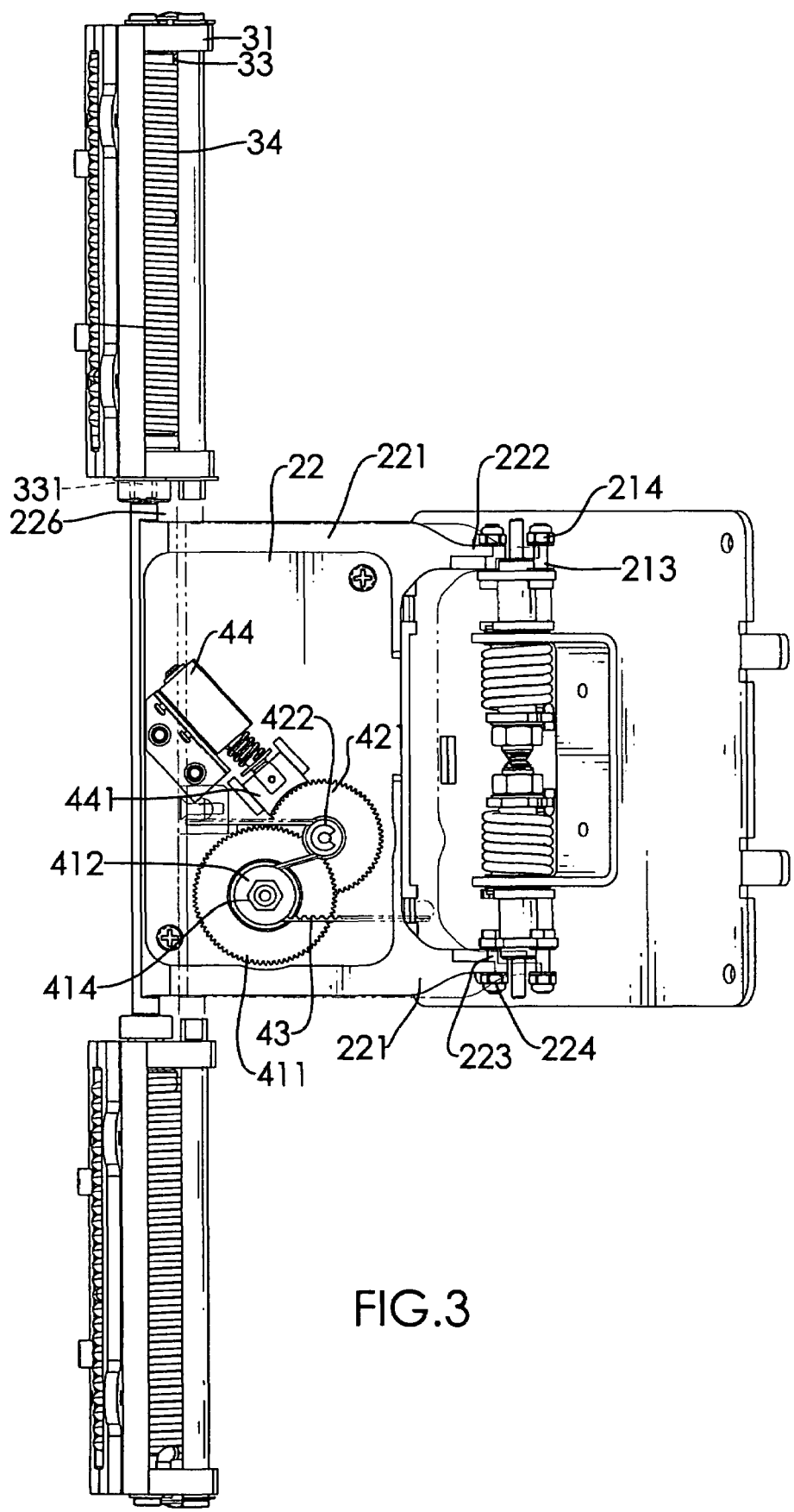
FIG. 3 is a top view of the dual-axle hinge in FIG. 1.

With further reference to FIG. 3, the shell (22) has two sides, two attaching leaves (221), two pins (223) and two nuts (224). The attaching leaves (221) are formed respectively on the two sides of the shell (22). Each attaching leaf (221) has a first end (222) and a second end (226). The first ends (222) of the attaching leaves (221) respectively correspond to the second holes (123) of the connecting sheets (12) of the adjusting assemblies (10). Each pin (223) of the shell (22) extends through the second end (222) of the attaching leaf (221) and the second hole (123) of the connecting sheet (12). Each nut (224) is fastened on the pin (223) to hold the attaching leaves (221) and the connecting sheets (12) securely together.

Each lifting assembly (30) connects to the connecting assembly (20) and comprises a bracket (31), a side shaft (32), a central shaft (33) and a torsion spring (34). The bracket (31) has an inner side and an outer side. The side shaft (32) is mounted rotatably in the bracket (31) and has a fastening rod (321). The fastening rod (321) of the side shaft (32) extends through the inner side of the bracket (31) of the lifting assembly (30) and is attached to the second end (216) of a corresponding attaching leaf (211) of the cover (21) of the connecting assembly (20). The central shaft (33) is mounted rotatably in the bracket (31) and has a fastening rod (331). The fastening rod (331) of the central shaft (33) extends though the inner side of the bracket (31) of the lifting assembly (30) and is attached to the second end (226) of a corresponding attaching leaf (221) of the shell (22) of the connecting assembly (20). The torsion spring (34) is mounted around the central shaft (33) and is attached respectively to the central shaft (33) and the bracket (31).

The positioning gear assembly (40) is mounted in the connecting assembly (30) and comprises an actuating gear assembly (41), an inactive gear assembly (42), a belt (43) and a solenoid (44).

The actuating gear assembly (40) has a transmission rod (413), a main gear (411), a secondary gear (412) and a nut (414). The transmission rod (413) is mounted securely on the shell (22) of the connecting assembly (20). The main gear (411) is mounted rotatably around the transmission rod (413) and has a top recess (415). The secondary gear (412) is mounted rotatably around the transmission rod (413) and is mounted rotatably in the top recess (415) of the main gear (411). The nut (414) is fastened on the transmission rod (413) to hold the main and secondary gears (411, 412). Adjusting the nut (41) adjusts the tightness between the main and secondary gears (411, 412) to change the friction between the main and secondary gears (411, 412).

The inactive gear assembly (42) has an axle (423), a positioning gear (421), an additional gear (424) and a sleeve (422). The axle (423) is mounted securely on the shell (22) of the connecting assembly (20). The positioning gear (421) is mounted rotatably around the axle (423). The additional gear (424) is formed on the positioning gear (421) and engages the main gear (411) of the actuating gear assembly (41). The sleeve (422) is mounted rotatably around the axle (423).

The belt (43) is mounted around the secondary gear (412) of the actuating gear assembly (41) and the sleeve (422) of the positioning gear assembly (42) and has two ends fastened on the cover (21) of the connecting assembly (20). The belt (43) is fastened on the cover (21) of the connecting assembly (20), and the actuating and inactive gear assemblies (41, 42) are mounted rotatably on the shell (22) of the connecting assembly (20).

The solenoid (44) is mounted on the shell (22) and has an extension rod (441) with a teeth end selectively engaging the positioning gear (421) of the positioning gear assembly (42). When the solenoid (44) is switched on, the extension rod (441) extends out of the solenoid (44) and the teeth end of the extension rod (441) engages the positioning gear (421) to keep the positioning gear (421) from rotating. When the solenoid (44) is switched off, the teeth end of the extension rod (441) is disengaged from the positioning gear (421).

Figure 4:
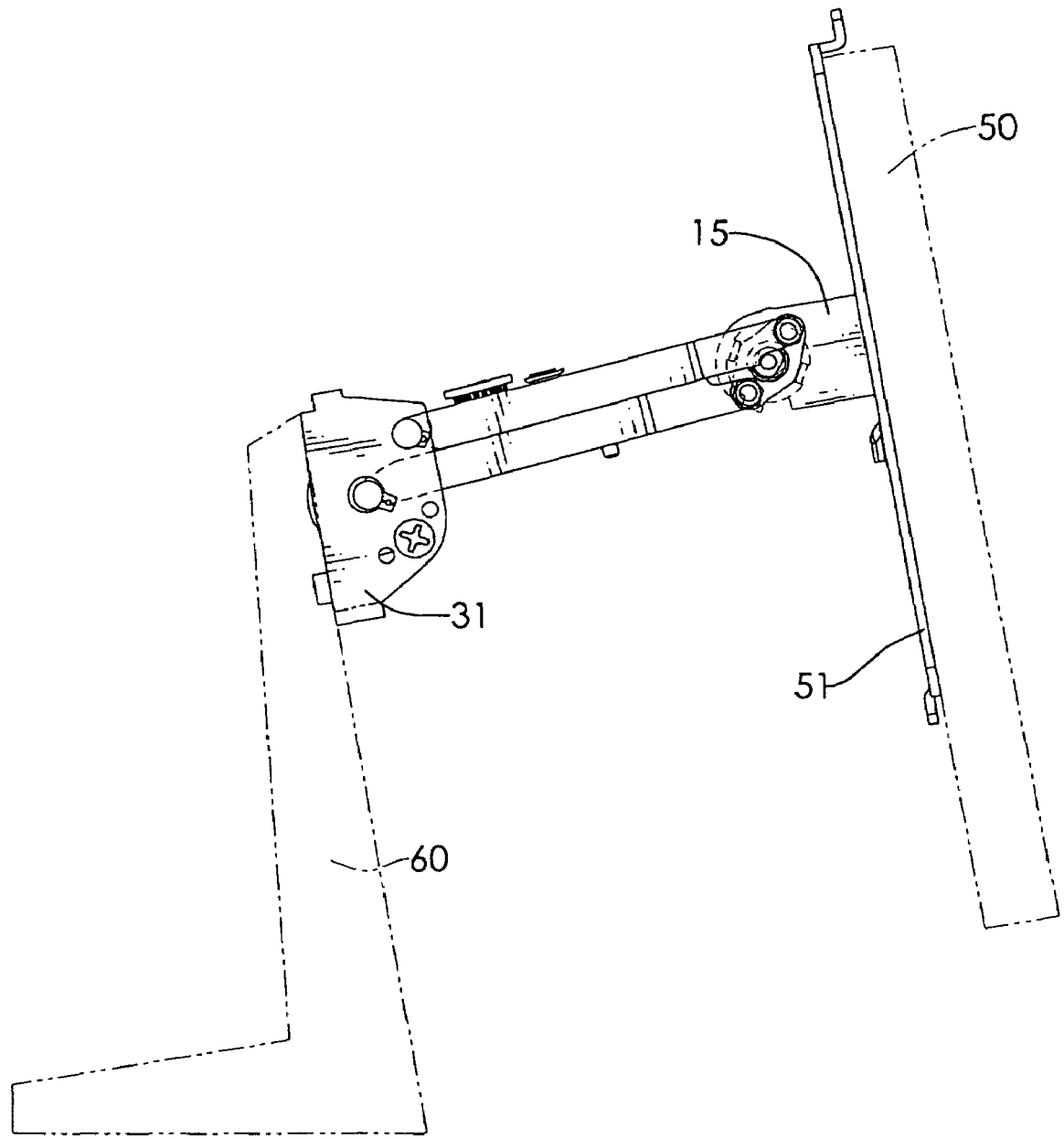
FIG. 4 is an operational side view of the dual-axle hinge in FIG. 1 with a screen and a support.

With further reference to FIG. 4, the rotating brackets (15) of adjusting assemblies (10) are attached to a screen (50) of a liquid crystal display (LCD). The rotating brackets (15) can be attached to a back board (51), and then the back board (51) is attached to the screen (50). The brackets (31) of the lifting assembly (30) are attached to a support (60) of the LCD.

Figure 5:
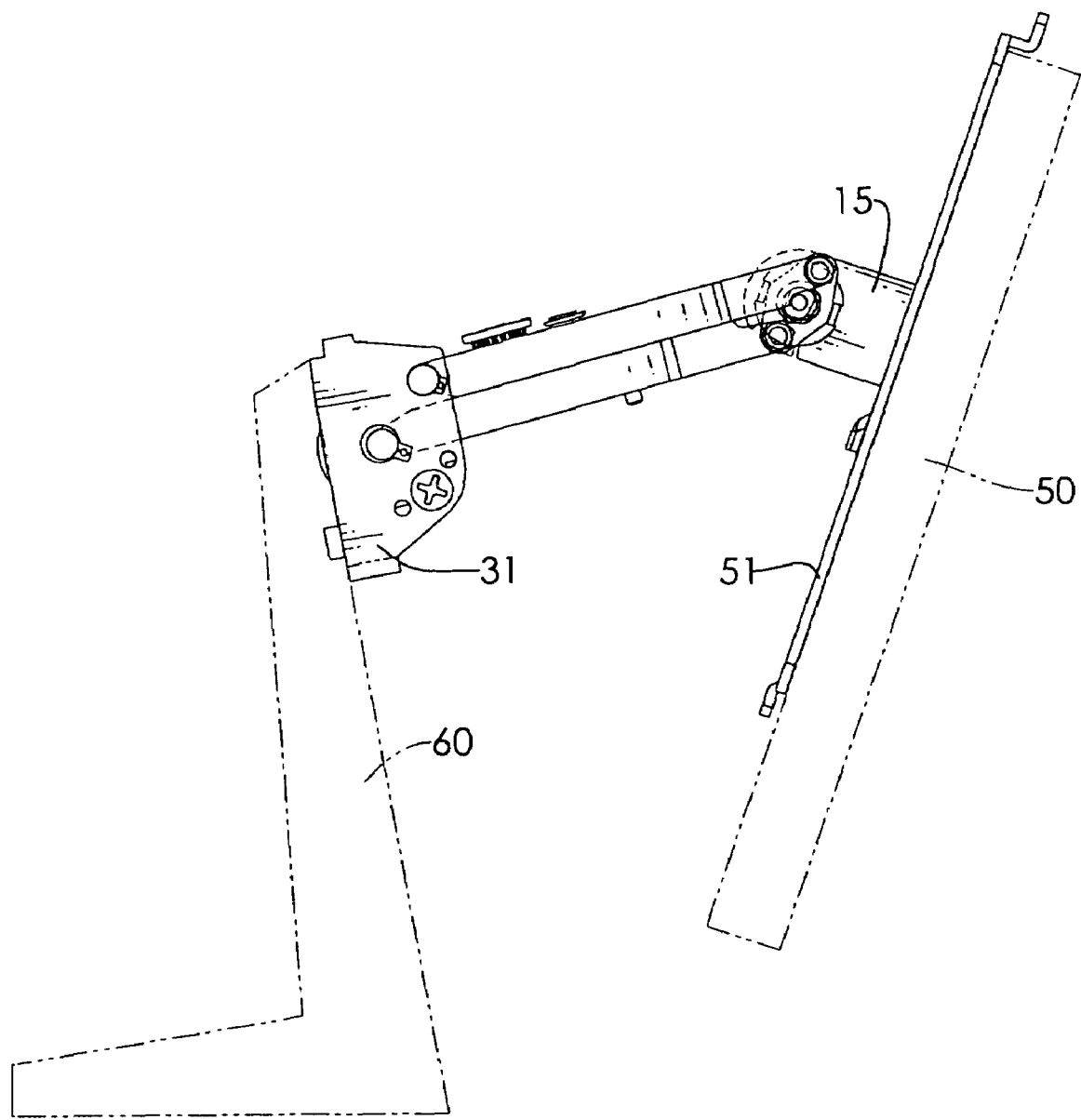
FIG. 5 is an operational side view of the dual-axle hinge in FIG. 1 with a screen and a support.

With further reference to FIG. 5, the screen (50) is turned. The rotating brackets (15) are rotated relative to the adjusting shafts (11) to adjust the visual angle of the screen (50). The limiting protrusions (132) of the limiting sheets (13) slide in the notches (152) of the rotating brackets (15) to limit the rotating angle of the screen (50).

Figure 6:
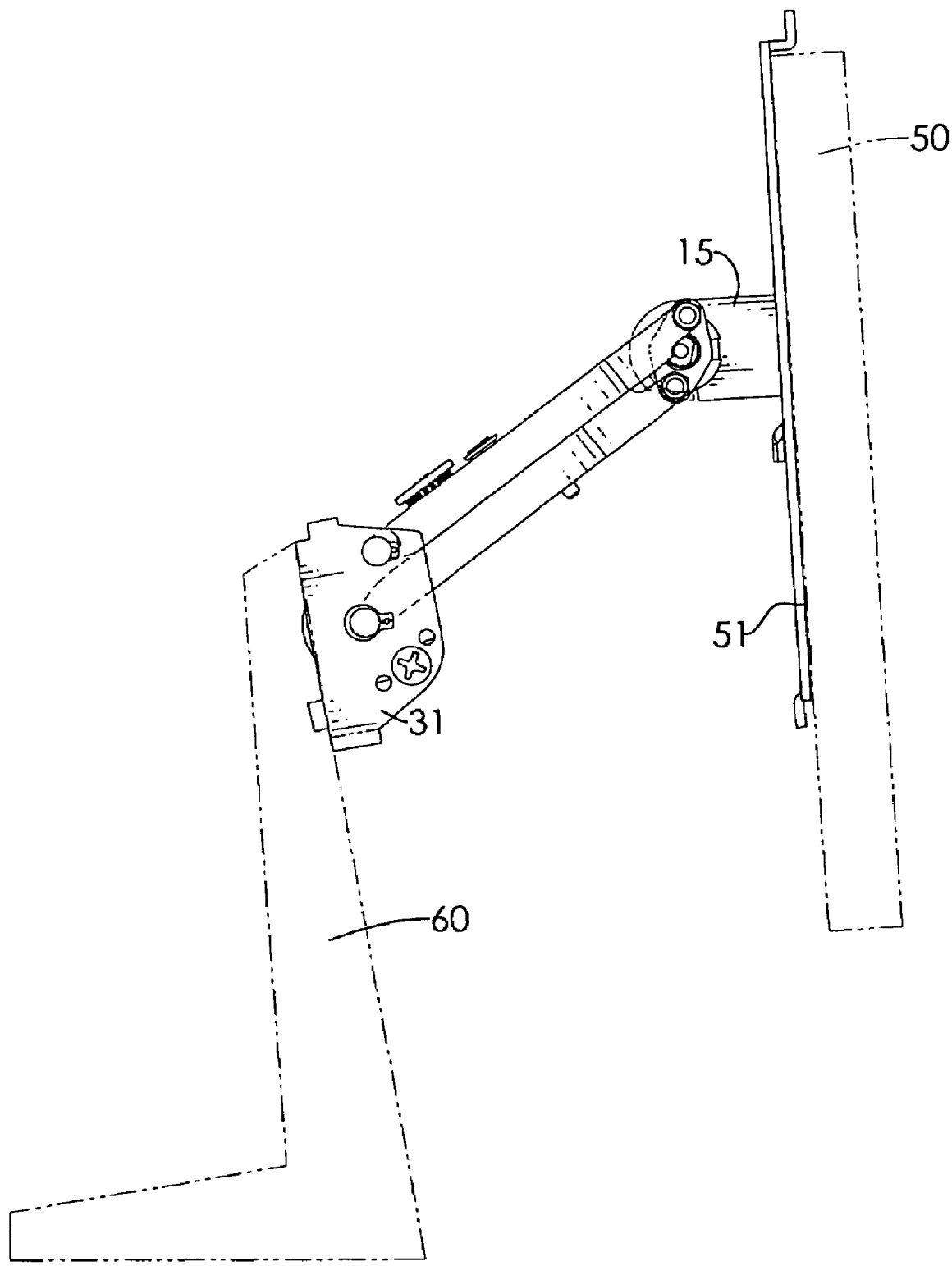
FIG. 6 is an operational side view of the dual-axle hinge in FIG. 1 with a screen and a support.
Figure 7:
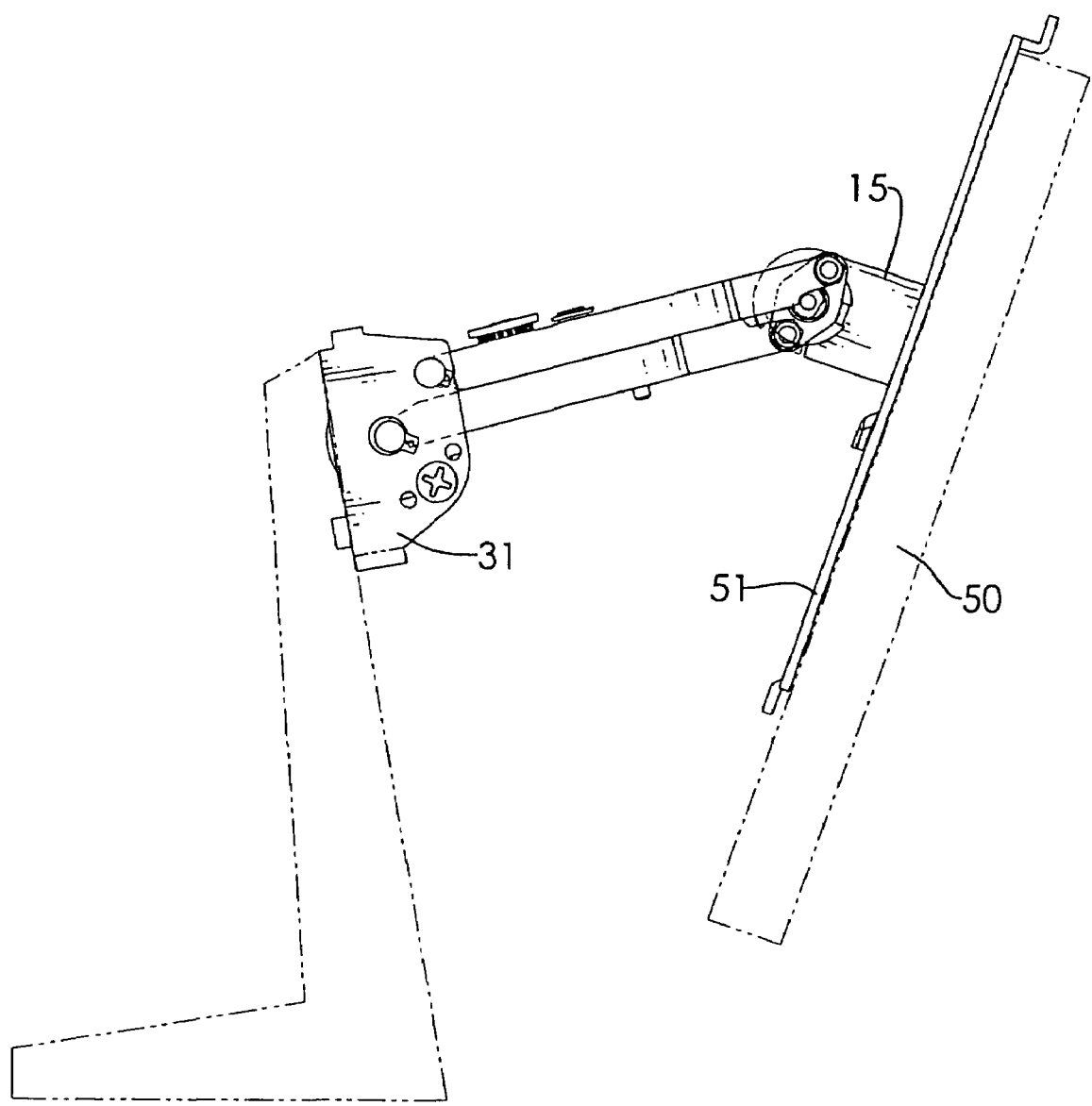
FIG. 7 is an operational side view of the dual-axle hinge in FIG. 1 with a screen and a support.

With further reference to FIGS. 6 and 7, the screen (50) is lifted upward or downward. Because the cover (21) and the shell (22) rotate via different shafts (32, 33), the belt (43) moves relative to the secondary gear (412) of the actuating gear assembly (41) and the sleeve (422) of the positioning gear assembly (42) when the cover (21) and the shell (22) are pivoted. Therefore, the secondary gear (412) of the actuating gear assembly (41) and the sleeve (422) of the positioning gear assembly (42) are rotated when the cover (21) and the shell (22) are pivoted. When the solenoid (44) is switched off, the shafts (32, 33) freely rotate. Thus the torsion springs (34) bring the screen (50) back to the normal position when the user releases the screen (50). When the solenoid (44) is switched on, the teeth end of the extension rod (441) engages the positioning gear (421) to keep the positioning gear (421) from rotating. Then the additional gear (424) and the main gear (411) cannot rotate. Therefore, the friction is generated between the secondary gear (412) and the main gear (411) to keep the belt (43) from moving. Thus, the screen (50) is positioned at a desired height.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A duel-axle hinge comprising:
   two adjusting assemblies connected to each other, and each adjusting assembly comprising
      an adjusting shaft, wherein the two adjusting shafts of the two adjusting assemblies are connected to each other;
      a connecting sheet mounted securely on the adjusting shaft;
      a rotating bracket mounted around the adjusting shaft;
      a torsion spring mounted around the adjusting shaft and respectively attached to the rotating bracket and the adjusting shaft; and
      a fastener mounted securely on the adjusting shaft;
   a connecting assembly connected to the adjusting assemblies and comprising
      a cover having
         two sides; and
         two attaching leaves formed respectively on the two sides of the cover, and each attaching leaf having a first end and a second end; and
      a shell having
         two sides; and
         two attaching leaves formed respectively on the two sides of the shell, and each attaching leaf having a first end and a second end;
   two lifting assemblies connecting to the connecting assembly, and each lifting assembly comprising
      a bracket having an inner side and an outer side;
      a side shaft mounted rotatably in the bracket and connecting to the cover of the connecting assembly;
      a central shaft mounted rotatably in the bracket and connecting to the shell of the connecting assembly; and
      a torsion spring mounted around the central shaft and attached respectively to the central shaft and the bracket; and
   a positioning gear assembly mounted in the connecting assembly and comprising
      an actuating gear assembly having
         a transmission rod mounted securely on the shell of the connecting assembly;
         a main gear mounted rotatably around the transmission rod;
         a secondary gear mounted rotatably around the transmission rod and mounted rotatably on the main gear; and
         a nut fastened on the transmission rod to hold the main and secondary gears;
      an inactive gear assembly having
         an axle mounted securely on the shell of the connecting assembly;
         a positioning gear mounted rotatably around the axle;
         an additional gear formed on the positioning gear and engaging the main gear of the actuating gear assembly; and
         a sleeve mounted rotatably around the axle;
      a belt mounted around the secondary gear of the actuating gear assembly and the sleeve of the positioning gear assembly and having two ends fastened on the cover of the connecting assembly; and
      a solenoid mounted on the shell and having an extension rod with a teeth end selectively engaging the positioning gear of the positioning gear assembly.

2. The duel-axle hinge as claimed in claim 1, wherein
   the primary gear of the actuating gear assembly has a top recess; and
   the secondary gear is mounted rotatably in the top recess of the main gear.

3. The duel-axle hinge as claimed in claim 1, wherein
   each adjusting assembly has
      a limiting sheet mounted securely on the adjusting shaft of the adjusting assembly and having
         an edge; and
         a limit protrusion formed on and extending axially out of the edge of the limiting sheet; and
      a first sleeve mounted around the adjusting shaft between the connecting sheet and the limiting sheet of the adjusting assembly; and
   the rotating bracket of each adjusting assembly has
      an edge; and
      a notch formed radially in the edge of the rotating bracket and corresponding to the limiting protrusion of a corresponding limiting sheet to provide the limiting protrusion sliding in the notch.

4. The duel-axle hinge as claimed in claim 1, wherein
   the rotating bracket of each adjusting assembly has multiple fastening holes formed through the rotating bracket;
   each adjusting assembly has
      multiple spacers mounted around the adjusting shaft of the adjusting assembly, and each spacer having a fastening protrusion formed on the spacer and extending through a corresponding fastening hole in the rotating bracket;
      a fastening washer mounted securely on the adjusting shaft; and
      a second sleeve mounted around the adjusting shaft adjacent to the fastening washer; and
   the torsion spring of each adjusting assembly is attached respectively to a corresponding rotating bracket and a corresponding fastening washer.

5. The duel-axle hinge as claimed in claim 3, wherein
   the adjusting shaft of each adjusting assembly has a non-circular extension rod formed axially on the inner end of the adjusting shaft and having a distal end;
   the connecting sheet of each adjusting assembly having a non-circular central hole to engage the extension rod of a corresponding adjusting shaft; and
   the limiting sheet of each adjusting assembly having a non-circular central hole to engage the extension rod of the adjusting shaft.

6. The duel-axle hinge as claimed in claim 5, wherein
   the adjusting shaft of one of the two adjusting assembly has a connecting rod formed on the distal end of the adjusting shaft; and
   the adjusting shaft of the other one of the two adjusting assembly has a mounting recess formed in the distal end of the adjusting shaft and engaging the connecting rod to connect two adjusting assemblies.

7. The duel-axle hinge as claimed in claim 5, wherein
   the adjusting shaft of each adjusting assembly has multiple threads formed around the extension rod; and
   the fastener of each adjusting assembly is a nut to screw onto the threads on a corresponding adjusting shaft.

8. The duel-axle hinge as claimed in claim 1 further comprising a connecting board attached respectively to the two rotating brackets to connect the two rotating brackets.

* * * * *